United States Patent [19]
Chown

[11] 4,109,994
[45] Aug. 29, 1978

[54] SINGLE OPTICAL FIBER CONNECTOR

[75] Inventor: Martin Chown, Harlow, England

[73] Assignee: International Telephone and Telegraph Corporation, New York, N.Y.

[21] Appl. No.: 769,555

[22] Filed: Feb. 17, 1977

[51] Int. Cl.$^2$ .............................................. G02B 5/14
[52] U.S. Cl. ............................ 350/96.21; 350/96.18
[58] Field of Search ............... 350/96 C, 96 R, 96 B, 350/96.21, 96.18

[56] References Cited
U.S. PATENT DOCUMENTS

| | | | |
|---|---|---|---|
| 3,950,075 | 4/1976 | Cook et al. ..................... | 350/96 C |
| 3,960,531 | 6/1976 | Kohanzadeh et al. ........... | 350/96 C |
| 3,989,567 | 11/1976 | Tardy ............................... | 350/96 C |
| 4,049,414 | 9/1977 | Smith .............................. | 350/96 WG |
| 4,050,783 | 9/1977 | Tardy ............................... | 350/96 C |

FOREIGN PATENT DOCUMENTS 1,429,843  3/1976  United Kingdom ................. 350/96 C

OTHER PUBLICATIONS

Laser Focus, Dec. 75, by M. Dakss, pp. 31–34.

*Primary Examiner*—John K. Corbin
*Assistant Examiner*—Stewart Levy
*Attorney, Agent, or Firm*—Thomas L. Peterson

[57] ABSTRACT

A connector for coupling a plurality of pairs of single optical fibers is disclosed. A pair of optical fiber terminations abut in a V-groove. Each termination comprises a set of more than three cylinders closely packed side-by-side to provide a plurality of interstitial apertures therebetween into which single fibers are individually inserted. Because the two terminations are positioned in the V-groove, the fibers in one termination will be accurately aligned with corresponding fibers in the other termination.

3 Claims, 6 Drawing Figures

SINGLE OPTICAL FIBER CONNECTOR

BACKGROUND OF THE INVENTION

The present invention relates to a connector and, more specifically, to an optical fiber connector for single fibers.

The invention is particularly applicable to a multi-channel connector of the type in which two fiber terminations are placed in substantially abutting relationship so that light emitted from the ends of single optical fibers in one termination is directed into corresponding fiber ends in the other termination. A critical factor in such a connector is the accurate alignment of the fibers in one termination with those in the other termination. The present invention achieves this result.

SUMMARY OF THE INVENTION

According to the principal aspect of the present invention, there is provided a multi-channel single fiber connector for coupling a plurality of pairs of single optical fibers in accurate alignment. The connector comprises an alignment block having a V-groove therein. A pair of optical fiber terminations having mating end faces abut in the V-groove. Each termination comprises a set of more than three cylinders closely packed side-by-side to provide a plurality of interstitial apertures therebetween into which single fibers are individually inserted from the rear of the termination. The fibers extend forwardly to a position adjacent to the mating end face of the termination. Because the two terminations are positioned in a V-groove, the fibers in one termination will be accurately aligned with the fibers in the other termination.

DESCRIPTION OF THE PREFERRED EMBODIMENTS

Figure 1:
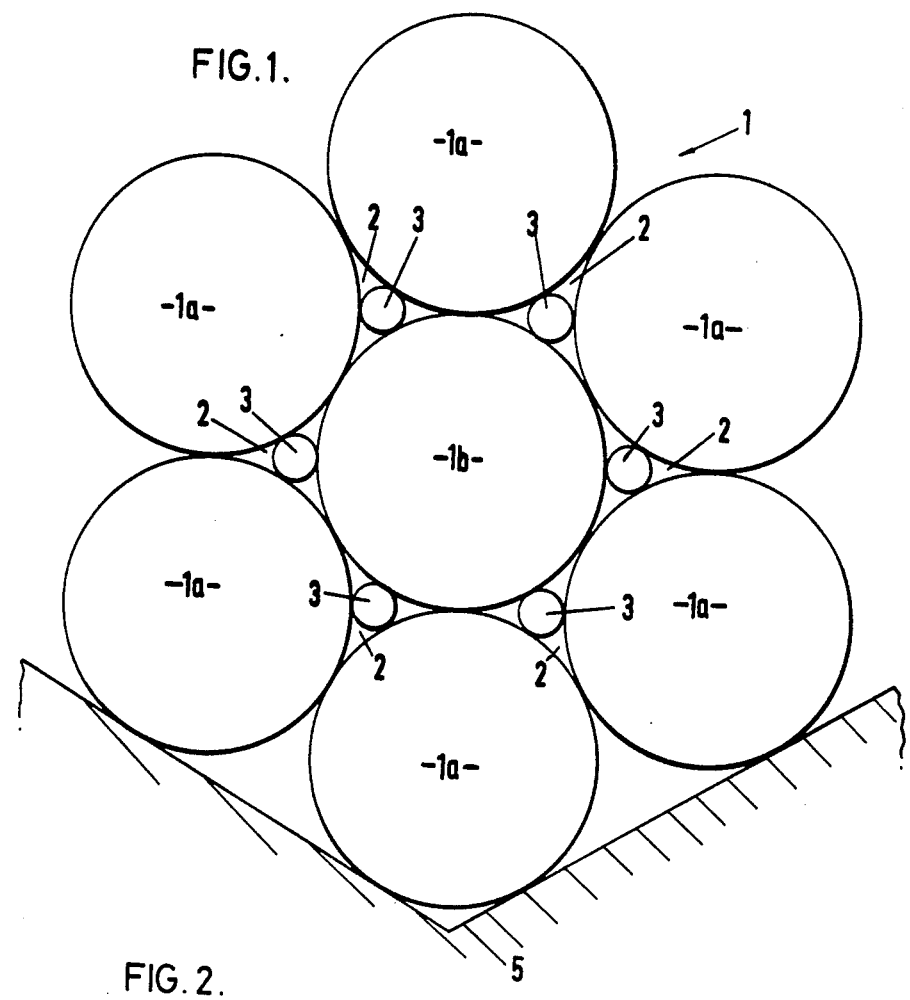
FIG. 1 is an end view of a multi-channel single optical fiber termination in accordance with the present invention.
Figure 2:
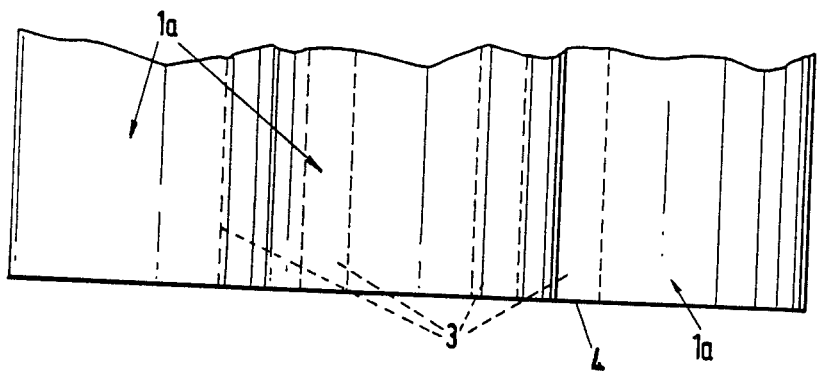
FIG. 2 is a side elevational view of the front end of the termination of FIG. 1.
Figure 3:
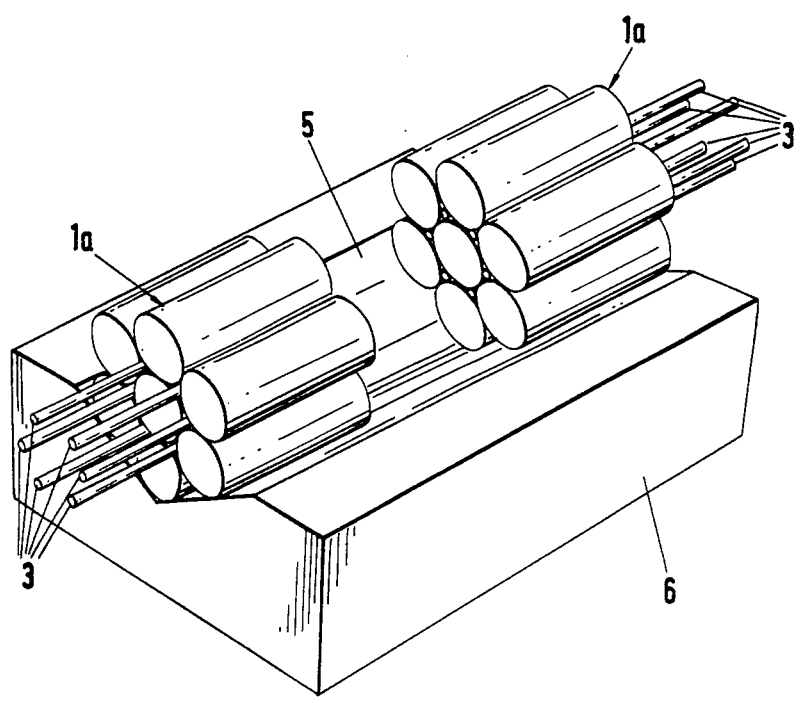
FIG. 3 is a perspective view of the connector of the invention with two optical fiber terminations as illustrated in FIGS. 1 and 2 shown axially spaced in a V-groove prior to complete mating.

In FIG. 1 there is shown a termination, generally designated 1, comprising a number of identical accurately ground cylinders 1a placed around an identical central cylinder 1b to form a plurality of tricuspid interstices 2. Into each interstice 2 there is inserted an end of an optical fiber 3. All the fiber ends have the same diameter. If there are 7 cylinders in all, each having a diameter which is 6.464 times the fiber diameter, the fibers will have an accurate fit in the interstitial spaces between the cylinders. The whole assembly is then secured, e.g. by potting (not shown). The ends of the fibers 3 and the corresponding ends of the cylinders 1a are ground and then polished flat in a plane normal to the longitudinal axes of the cylinders and fibers, thereby providing a mating end face 4. When two similar terminations are placed with their mating end faces 4 together in a V-groove 5 formed in a block 6, as shown in FIG. 2, the fibers of one termination will be in accurate alignment with those of the other termination, provided that always the cylinders are all accurately ground and are all of the same diameter.

If the fibers are 100μ in diameter, the total diameter of the termination in this case would be 3 × 646μ = 1.938mm. Since the termination can have a high length to diameter ratio, alignment of the fibers in the two terminations can be very accurate. Assembly is facilitated by this form of construction since the fibers can be inserted while the cylinders are still loose, thus allowing the interstitial spaces to be enlarged at will by displacement of the cylinders. The whole assembly should be clamped tight before potting.

While a seven-cylinder configuration has been described to provide a six-fiber connector, it will be appreciated that other configurations and numbers are possible, e.g. four cylinders and two fibers, five cylinders and three fibers, and so on. Similarly, it is not necessary for an arrangement in which a central cylinder is surrounded by a number of cylinders for the central cylinder to have the same diameter as the surrounding cylinders, provided that all the surrounding cylinders are identical. Thus, a smaller central cylinder can be surrounded with only five cylinders (for a five-fiber assembly) or a larger central cylinder can be surrounded by seven cylinders (for a seven-fiber assembly). The angle between the limbs of the V-shaped guide will be dependent on the particular configuration of the assembly.

A disadvantage of the simple connector terminations so far described is that their size depends directly on the fiber diameter and so it is only possible to connect two terminations which both have fibers of the same diameter. Another disadvantage is that where low cost fibers are used, the fiber diameter may have significant variations so that the fiber ends do not always have an accurate fit in the interstitial spaces. Finally, with very small diameter fibers the complete termination may itself be too small for convenience.

Figure 4:
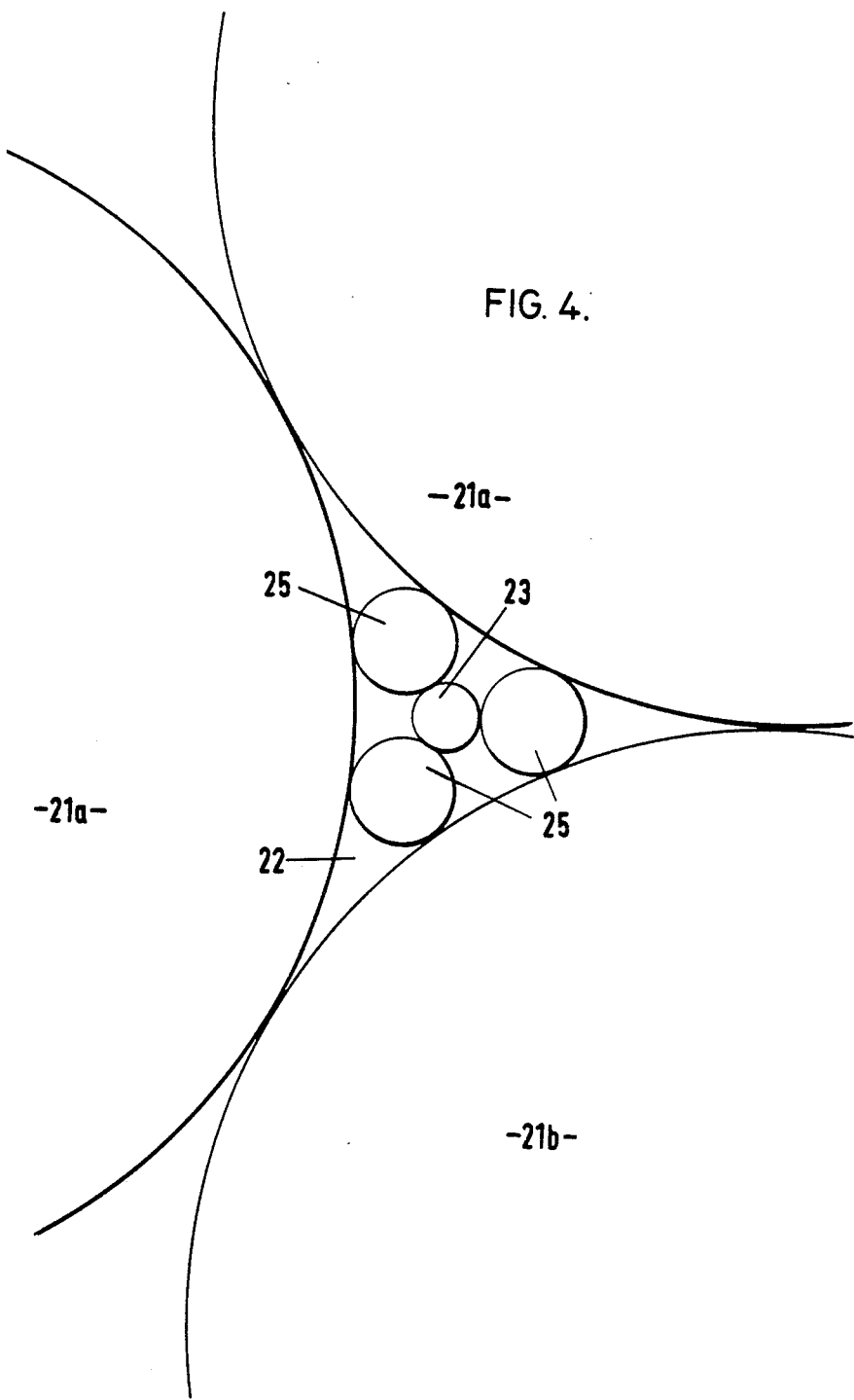
FIG. 4 is an end view of a modification of the termination of FIG. 1.

These problems may be overcome by the use of larger primary cylinders in combination with small intermediate cylinders as shown in FIG. 4. For the sake of simplicity, only one interstitial space is illustrated, between three closely packed primary cylinders 21a which correspond to the cylinders 1a in FIG. 1. Because the cylinders 21a are now much larger than in FIG. 1, the interstitial space 22 is also much larger. The fiber 23 (still the same diameter) is now located between three intermediate cylinders 25 which in turn are each located by the recess between two adjacent primary cylinders 21a. The advantages of this arrangement are that the overall size of the termination can be increased and that larger intermediate cylinders can be used to compensate for smaller fiber diameters while maintaining the fiber axis central between the three primary cylinders. This last advantage can be used to deal with both of the first two disadvantages mentioned above since the alignments of the terminations and the interstitial spaces depend solely on the arrangement of primary cylinders when the terminations are placed in the connector V-groove.

In practice, whereas the primary cylinders 21a are best made of accurately ground metal pieces, the intermediate cylinders 25 can be of softer material, e.g. a plastic material. The use of softer intermediate cylinders can result in relatively accurate centering of the fiber when the latter is not exactly the correct diameter, the intermediate cylinders being deliberately made fractionally oversize to act as cushions when the whole assembly is clamped up tight.

When dealing with the problem of using fibers which are not merely accidentally of different sizes but deliberately so, assembly of a termination can be simplified by the use of a constant standardised size of primary cylinder for all cases but using intermediate cylinders selected from stocks of different sized cylinders to suit the fiber diameter. So long as the three intermediate cylinders surrounding each fiber are all the same size, the fibers will always be centered in the interstitial spaces resulting in correct fiber alignment whatever variations in fiber size occur.

Figure 6:
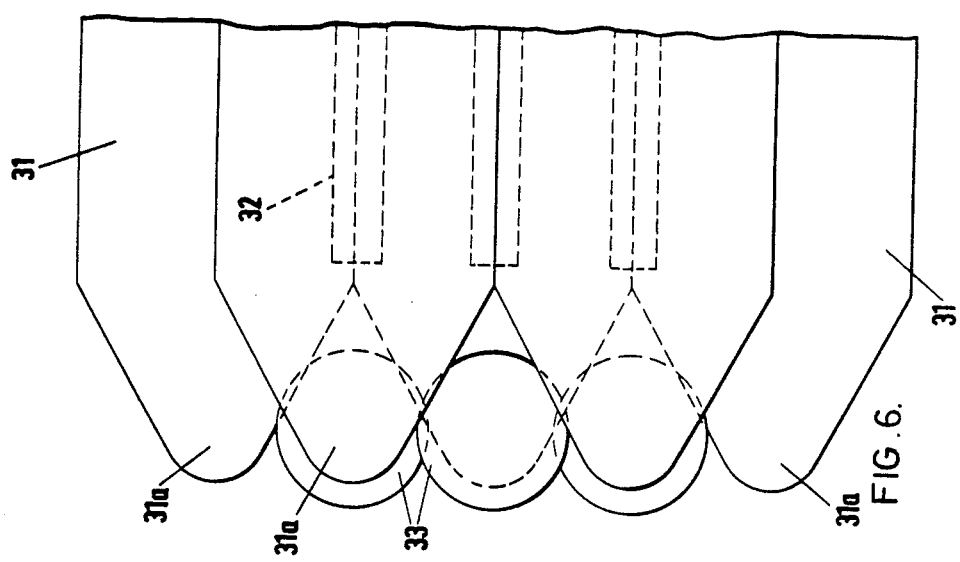
FIG. 6 is a side view of the front end of the termination of FIG. 5.
Figure 5:
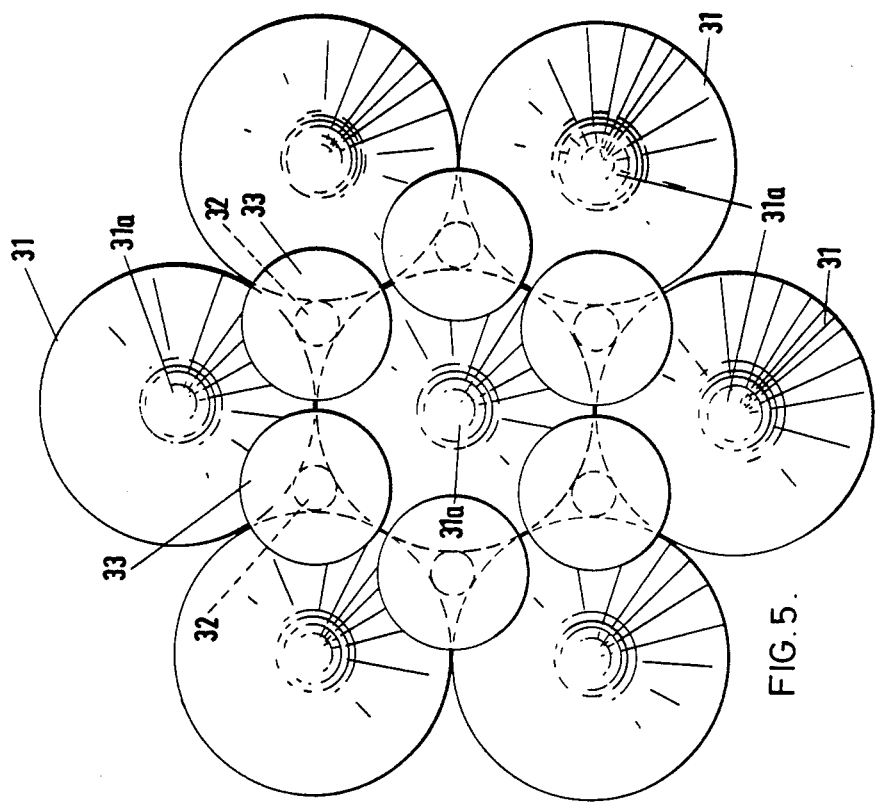
FIG. 5 is an end view of a further modification of the termination of FIG. 1.

The only type of connector considered so far is that where two terminations having flat ends are butted together. Another type of termination is one where each fiber end has a ball lens placed at the focal distance from the end of the fiber. Such a termination is illustrated is FIGS. 5 and 6. In this case, the cylinders 31 extend beyond the ends of the fibers 32 and are tapered to provide conical portions 31a. Ball lenses 33 are each located between three adjacent conical portions 31a. The fibers are inserted into the termination only far enough to provide the correct distance between the lens and the fiber ends. When the ball lens is situated at the focal distance from the fiber, light emitted from the fiber is focussed by the lens into a collimated ray. Similarly collimated light parallel to the axis of the termination is focussed onto the end of the fiber. Two such terminations, when correctly aligned, need not be abutting but can be slightly spaced apart and yet still provide a multi-channel single fiber connector.

What is claimed is:

1. An optical fiber termination for a single optical fiber cable comprising:

a set of at least three cylinders closely packed side-by-side to provide at least one interstitial aperture therebetween;

said cylinders terminating in a mating end face;

a single optical fiber individually inserted into said aperture from the rear of said cylinders and extending forwardly to a position adjacent to said mating end face;

said fiber being positioned in the center of said aperture by three additional cylinders spaced from each other and each of which abuts against two of said first-mentioned cylinders and said fiber; and said additional cylinders all having the same diameter, said diameter being less than that of each said cylinder of said set.

2. A termination as set forth in claim 1 wherein:

the diameter of each of said three adjacent cylinders of said set is greater than 6.464 times the diameter of said fiber.

3. An optical fiber termination for a single optical fiber cable comprising:

a set of at least three cylinders closely packed side-by-side to provide at least one interstitial aperture therebetween;

said cylinders terminating in a mating end face;

a single optical fiber individually inserted into said aperture from the rear of said cylinders and extending forwardly to a position adjacent to said mating end face;

said cylinders protruding beyond the forward end of said fiber;

said protruding ends of said cylinders being tapered to provide conical end portions;

a ball lense positioned between the conical end portions of said three adjacent cylinders; and said fiber being located at the focal distance from said ball lense.

* * * * *